United States Patent
Thielen et al.

(10) Patent No.: US 7,288,602 B2
(45) Date of Patent: *Oct. 30, 2007

(54) SILICA FILLED MULTI-VISCOELASTIC RESPONSE RUBBER

(75) Inventors: Georges Marcel Victor Thielen, Schouweiler (LU); Howard Allen Colvin, Arlington, TX (US)

(73) Assignee: The Goodyear Tire & Rubber Company, Akron, OH (US)

( * ) Notice: Subject to any disclaimer, the term of this patent is extended or adjusted under 35 U.S.C. 154(b) by 28 days.

This patent is subject to a terminal disclaimer.

(21) Appl. No.: 11/054,676

(22) Filed: Feb. 9, 2005

(65) Prior Publication Data

US 2005/0148693 A1    Jul. 7, 2005
US 2006/0142426 A9    Jun. 29, 2006

Related U.S. Application Data

(63) Continuation of application No. 10/084,890, filed on Feb. 27, 2002, now abandoned, which is a continuation-in-part of application No. 09/264,937, filed on Mar. 9, 1999, now Pat. No. 6,469,104.

(60) Provisional application No. 60/276,588, filed on Mar. 16, 2001, provisional application No. 60/120,024, filed on Feb. 13, 1999, provisional application No. 60/117,305, filed on Jan. 26, 1999, provisional application No. 60/109,530, filed on Nov. 23, 1998, provisional application No. 60/104,755, filed on Oct. 19, 1998, provisional application No. 60/079,789, filed on Mar. 28, 1998, provisional application No. 60/113,663, filed on Mar. 11, 1998.

(51) Int. Cl.
    *C08F 36/06*     (2006.01)
    *C08K 3/22*     (2006.01)

(52) U.S. Cl. ............... 525/332.6; 525/332.1; 525/331.9; 525/343; 524/432

(58) Field of Classification Search ............. 525/332.6, 525/331.9, 333.3, 342; 524/267, 432
See application file for complete search history.

(56) References Cited

U.S. PATENT DOCUMENTS

| | | | | | |
|---|---|---|---|---|---|
| 4,471,093 | A | * | 9/1984 | Furukawa et al. | 525/237 |
| 4,537,936 | A | * | 8/1985 | Takao et al. | 525/236 |
| 5,087,668 | A | * | 2/1992 | Standstrom et al. | 525/237 |
| 5,534,592 | A | * | 7/1996 | Halasa et al. | 525/236 |
| 5,959,039 | A | * | 9/1999 | Yokoyama et al. | 525/236 |
| 6,166,140 | A | * | 12/2000 | Sandstrom et al. | 525/197 |
| 6,232,404 | B1 | * | 5/2001 | Sandstrom et al. | 525/197 |

FOREIGN PATENT DOCUMENTS

EP     942042     9/1999

* cited by examiner

*Primary Examiner*—David W. Wu
*Assistant Examiner*—Rip A. Lee
(74) *Attorney, Agent, or Firm*—John D. DeLong

(57) ABSTRACT

The present invention relates to silica filled multi-viscoelastic response rubber which is thermomechanically mixed with an organosilicon compound during the non-productive mix stage and zinc oxide is added during the productive stage of mixing.

5 Claims, No Drawings

SILICA FILLED MULTI-VISCOELASTIC RESPONSE RUBBER

The Applicants hereby incorporate by reference prior U.S. Provisional Application Ser. No. 60/276,588, filed on Mar. 16, 2001.

This Application is a continuation of Ser. No. 10/084,890, filed Feb. 27, 2002, now abandoned which is a continuation-in-part of Ser. No. 09/264,937, filed Mar. 9, 1999, now U.S. Pat. No. 6,469,104, which claims the benefit of Ser. Nos. 60/113,663, filed Mar. 11, 1998; 60/079,789 filed Mar. 28, 1998; 60/104,755 filed Oct. 19, 1998; 60/109,530 filed Nov. 23, 1998; 60/117,305 filed Jan. 26, 1999; and 60/120,024 filed Feb. 13, 1999. Ser. No. 10/084,890 further claims the benefit of Ser. No. 60/276,588 filed Mar. 16, 2001.

FIELD OF THE INVENTION

The present invention relates to a compound which is useful in rubber articles and the processing of sulfur curable rubber compositions.

BACKGROUND OF THE INVENTION

A wide variety of rubber products are made with styrene-butadiene rubber (SBR). For instance, large quantities of SBR are utilized in manufacturing tires for automobiles, trucks, aircraft and other types of vehicles. SBR is commonly used in manufacturing tires because it generally improves traction characteristics over polybutadiene rubber.

SBR can be synthesized by utilizing either solution or emulsion polymerization techniques. SBR made by solution polymerization (solution SBR) typically exhibits much better rolling resistance and treadwear characteristics in tire treads. For this reason, solution SBR is often considered to be preferable to emulsion SBR and currently sells at a premium price to emulsion SBR.

For further details on emulsion SBR and the "standard recipe", see *The Vanderbilt Rubber Handbook*, George G. Winspear (Editor), R. T. Vanderbilt Company, Inc. (1968) at Pages 34 through 57.

EP 942042 discloses a method for the preparation of multi-viscoelastic response (MVR) rubber and its use in pneumatic tires. These polymers show advantages over conventional emulsion SBR in processing and wear characteristics when used in tires.

SUMMARY OF THE INVENTION

The present invention relates to a silica filled multi-viscoelastic response rubber which is thermomechanically mixed with an organosilicon compound during a non-productive stage of mixing and zinc oxide is added during the productive stage of mixing.

DETAILED DESCRIPTION OF THE INVENTION

There is disclosed a method for processing a rubber composition by a multi-stage mixing procedure comprising at least one non-productive stage and a productive stage:

(A) wherein said non-productive stage is characterized by mixing a rubber composition at a rubber temperature in a range from 140° C. to 190° C. for a mixing time of from 1 to 20 minutes, and said rubber composition comprises (1) 100 parts by weight of at least one sulfur vulcanizable elastomer
wherein
(a) from 40 to 100 parts by weight of said vulcanizable elastomer is a multi-viscoelastic response rubber; and
(b) from zero to 60 parts by weight of said vulcanizable elastomer is a rubber other than said multi-viscoelastic rubber;
(2) from 0.1 to 25 phr of an organosilicon compound of the formula:

Z-Alk-S$_n$-Alk-Z in which Z is selected from the group consisting of

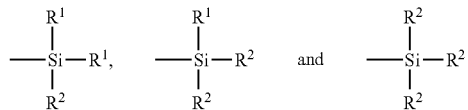

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent hydrocarbon of 1 to 18 carbon atoms and n is from 2 to 8;
(3) from 10 to 250 phr of a silica filler; and
(4) the absence of zinc oxide to form a non-productive compound;
and
(B) wherein said productive stage is characterized by mixing at a rubber temperature not to exceed 120° C. and the productive stage compound contains
(1) said non-productive compound;
(2) from 0.5 to 5 phr of a sulfur vulcanizing agent; and
(3) from 1 to 8 phr of zinc oxide.

The present invention relates to the use of a "multi-viscoelastic response" rubber or also referred to herein as "MVR" rubber. As used herein, a MVR rubber includes an emulsion styrene-butadiene rubber composition as described in detail in EP 942042 which is incorporated by reference in its entirety. The emulsion styrene-butadiene rubber is comprised of (A) a high molecular weight styrene-butadiene rubber having a weight average molecular weight of at least about 300,000 and
(B) a low molecular weight styrene-butadiene rubber having a weight average molecular weight of less than about 280,000;

wherein the ratio of the high molecular weight styrene-butadiene rubber to the low molecular weight styrene-butadiene rubber is within the range of about 80:20 to about 25:75; wherein the bound styrene content of the high molecular weight styrene-butadiene rubber may be the same or different from the bound styrene content of the low molecular weight styrene-butadiene rubber; wherein the styrene-butadiene rubber composition is made by coagulating a blend of a latex of the high molecular weight styrene-butadiene rubber and a latex of the low molecular weight styrene-butadiene rubber.

The latex of the high molecular weight styrene-butadiene rubber and the low molecular weight styrene-butadiene rubber may be made by a process which comprises (A) charging water, a soap system, a free radical generator, 1,3-butadiene monomer and styrene monomer into a first polymerization zone;

(B) allowing the 1,3-butadiene monomer and the styrene monomer to copolymerize in the first polymerization zone to a monomer conversion which is within the range of about 15 percent to about 40 percent to produce a low conversion polymerization medium;

(C) charging the low conversion polymerization medium into a second polymerization zone;

(D) charging an additional quantity of 1,3-butadiene monomer and an additional quantity of styrene monomer into the second polymerization zone; and (E) allowing the copolymerization to continue until a monomer conversion of at least about 50 percent is attained to produce the latex of styrene-butadiene rubber.

The MVR rubber is also an emulsion styrene-butadiene rubber composition which is comprised of (A) a high molecular weight styrene-butadiene rubber having a number average molecular weight which is within the range of about 200,000 to about 1,000,000 and (B) a low molecular weight styrene-butadiene rubber having a number average molecular weight which is within the range of about 20,000 to about 150,000; wherein the ratio of the high molecular weight styrene-butadiene rubber to the low molecular weight styrene-butadiene rubber is within the range of about 80:20 to about 25:75; wherein the bound styrene content of the high molecular weight styrene-butadiene rubber may be the same or different from the bound styrene content of the low molecular weight styrene-butadiene rubber; wherein the styrene-butadiene rubber composition is made by coagulating a blend of a latex of the high molecular weight styrene-butadiene rubber and a latex of the low molecular weight styrene-butadiene rubber.

The MVR rubber used in the present invention is a styrene-butadiene rubber composition which is comprised of repeat units which are derived from styrene and 1,3-butadiene, wherein the styrene-butadiene rubber composition has a number average molecular weight as determined by thermal field flow fractionation which is within the range of about 50,000 to 150,000 and wherein the styrene-butadiene rubber has a light scattering to refractive index ratio which is within the range of 1.8 to 3.9.

The MVR rubber is a styrene-butadiene rubber composition which is comprised of repeat units which are derived from styrene and 1,3-butadiene, wherein a plot of log frequency versus storage modulus of the styrene-butadiene rubber composition crosses over a plot of log frequency versus loss modulus of the styrene-butadiene rubber composition at a frequency within the range of 0.001 radians per second to 100 radians per second when conducted at 120° C. using parallel plate geometry in the dynamic oscillation frequency sweep of the styrene-butadiene rubber.

In addition, the MVR rubber is a styrene-butadiene rubber composition which is comprised of repeat units which are derived from styrene and 1,3-butadiene, wherein a plot of log frequency versus storage modulus of the styrene-butadiene rubber composition crosses over a plot of log frequency versus loss modulus of the styrene-butadiene rubber composition at a frequency within the range of 0.001 radians per second to 100 radians per second when conducted at 120° C. using parallel plate geometry in the dynamic oscillation frequency sweep of the styrene-butadiene rubber, wherein the styrene-butadiene rubber composition has a number average molecular weight as determined by thermal field flow fractionation which is within the range of about 50,000 to 150,000 and wherein the styrene-butadiene rubber has a light scattering to refractive index ratio which is within the range of 1.8 to 3.9.

The MVR rubber is made by synthesizing a high molecular weight SBR and a low molecular weight SBR by free radical emulsion polymerization. The styrene-butadiene rubber of this invention may be made by synthesizing a high molecular weight SBR and a low molecular weight SBR utilizing the general free radical emulsion polymerization technique described in U.S. Pat. No. 5,583,173. This polymerization technique is known as the FIM process (free-injection monomer). The latex of the high molecular weight SBR and the latex of the low molecular weight SBR are then blended and co-coagulated.

The FIM process is carried out by adding styrene monomer, 1,3-butadiene monomer, water, a free radical generator and a soap system to a first polymerization zone to form an aqueous polymerization medium. The first polymerization zone will normally be a reactor or series of two or more reactors. Copolymerization of the monomers is initiated with the free radical generator. This copolymerization reaction results in the formation of a low conversion polymerization medium.

At the point where the low conversion polymerization medium reaches a monomer conversion which is within the range of about 15 percent to about 40 percent, the low conversion polymerization medium is charged into a second polymerization zone. The second polymerization zone can be a reactor or a series of two or more reactors. In any case, the second polymerization zone is subsequent to the first polymerization zone. The low conversion polymerization medium will normally be charged into the second polymerization zone at a monomer conversion level which is within the range of about 17 percent to about 35 percent. It will more preferably be charged into the second polymerization zone at a level of monomer conversion which is within the range of 20 percent to 30 percent.

Additional styrene monomer and butadiene monomer are charged into the second polymerization zone. Normally, from about 20 percent to about 50 percent of the total amount of styrene monomer and 1,3-butadiene monomer will be charged into the second polymerization zone (from 50 percent to 80 percent of the total monomers are charged into the first polymerization zone). It is normally preferred to charge from about 30 weight percent to about 45 weight percent of the total quantity of monomers charged into the second polymerization zone (from 55 percent to 70 percent of the total monomers charged will be charged into the first polymerization zone). It is generally most preferred to charge from about 35 weight percent to about 42 weight percent of the total quantity of monomers charged into the second polymerization zone (from 58 percent to 65 percent of the total monomers charged will be charged into the first polymerization zone). By splitting the monomer charge between the first polymerization zone and the second polymerization zone, the total quantity of soap required to provide a stable latex is reduced by at least about 30 percent.

The copolymerization in the second polymerization zone is allowed to continue until a monomer conversion of at least 50 percent is attained. The copolymerization will preferably be allowed to continue until a total monomer conversion which is within the range of 50 percent to 68 percent is realized. More preferably, the copolymerization in the second reaction zone will be allowed to continue until a monomer conversion of 58 percent to 65 percent is reached.

In synthesizing the SBR latex, generally from about 1 weight percent to about 50 weight percent styrene and from about 50 weight percent to about 99 weight percent 1,3-butadiene are copolymerized. However, it is contemplated that various other vinyl aromatic monomers can be substituted for the styrene in the SBR. For instance, some representative examples of vinyl aromatic monomers that can be substituted for styrene or used in mixtures with styrene and copolymerized with 1,3-butadiene in accordance with this invention include 1-vinylnaphthalene, 3-methylstyrene, 4-methylstyrene, 3,5-diethylstyrene, 4-propylstyrene, 4-t-butylstyrene, 2,4,6-trimethylstyrene, 4-dodecylstyrene, 3-methyl-5-normal-hexylstyrene, 4-phenylstyrene, 2-ethyl-4-benzylstyrene, 3,5-diphenylstyrene, 2,3,4,5-tetraethyl-styrene, 3-ethyl-1-vinylnaphthalene, 6-isopropyl-1-vinylnaphthalene, 6-cyclohexyl-1-vinylnaphthalene, 7-dodecyl-2-vinylnaphthalene, α-methylstyrene, and the like. The high molecular weight SBR will typically contain from about 5 weight percent to about 50 weight percent bound styrene and from about 50 weight percent to about 95 weight percent bound butadiene. It is typically preferred for the high molecular weight SBR to contain from about 20 weight percent to about 40 weight percent styrene and from about 60 weight percent to about 80 weight percent 1,3-butadiene. Like ratios of styrene monomer and butadiene monomer will accordingly be charged into the first polymerization zone and the second polymerization zone.

Similar to the high molecular weight SBR, the low molecular weight SBR will normally contain from about 5 weight percent to about 50 weight percent styrene and from about 50 weight percent to about 95 weight percent 1,3-butadiene. In such cases, it is preferred for low molecular weight SBR to contain from about 20 weight percent to about 40 weight percent styrene and from about 60 weight percent to about 80 weight percent 1,3-butadiene.

The high molecular weight SBR may have the same or different bound styrene content from the bound styrene content of the low molecular weight SBR. If one elects to use a bound styrene content in excess of 40 weight percent, it is best to use a lower styrene content for other MVR rubber portion, such as with the high molecular or the low molecular weight SBR, i.e. less than 40 weight percent. If the high molecular weight SBR has a different bound styrene content from the low molecular weight SBR, the difference will generally be 5 to 40 percentage points. If different, the high molecular weight SBR will typically have a bound styrene content which differs from the bound styrene content of the low molecular weight SBR by at least 10 percentage points. In most cases, the high molecular weight SBR will have a bound styrene content which differs from the bound styrene content of the low molecular weight SBR by 10 to 30 percentage points with a difference of 15 to 25 percentage points being most typical. It is normally preferred for the high molecular weight SBR to have a bound styrene content which differs from the bound styrene content of the low molecular weight SBR by at least 15 percentage points with a difference of at least 20 percentage points being most preferred.

It should be understood that either the high molecular weight or the low molecular weight SBR can have the higher bound styrene content. In other words, the SBR in the blend having the higher bound styrene content can be either the low or the high molecular weight polymer in the blend. It should also be understood that polybutadiene (which contains 0 percent bound styrene) can be used as one of the polymers in the blend. In such cases, the polybutadiene can be either the high or the low molecular weight polymer. In cases where polybutadiene is used as one of the rubbery polymers in the blend, the SBR in the blend will typically have a bound styrene content of at least about 10 weight percent. In such cases, the SBR in the blend will more typically have a bound styrene content of at least about 15 weight percent and will most preferably have a bound styrene content of at least about 20 weight percent.

Essentially any type of free radical generator can be used to initiate such free radical emulsion polymerizations. For example, free radical generating chemical compounds, ultraviolet light or radiation can be used. In order to ensure a satisfactory polymerization rate, uniformity and a controllable polymerization, free radical generating chemical agents which are water- or oil-soluble under the polymerization conditions are generally used with good results.

Some representative examples of free radical initiators which are commonly used include the various peroxygen compounds such as pinane hydroperoxide, potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauryl peroxide, cumene hydroperoxide, p-menthane hydroperoxide, t-butyl hydroperoxide, acetyl acetone peroxide, dicetyl peroxydicarbonate, t-butyl peroxyacetate, t-butyl peroxymaleic acid, t-butyl peroxybenzoate, acetyl cyclohexyl sulfonyl peroxide, and the like; the various azo compounds such as 2-t-butylazo-2-cyanopropane, dimethyl azodiisobutyrate, azodiisobutyronitrile, 2-t-butylazo-1-cyanocyclohexane, and the like; the various alkyl perketals, such as 2,2-bis-(t-butylperoxy)butane, ethyl 3,3-bis(t-butylperoxy)butyrate, 1,1-di-(t-butylperoxy)cyclohexane, and the like. Persulfate initiators, such as potassium persulfate and ammonium persulfate, are especially useful in such aqueous emulsion polymerizations.

The amount of initiator employed will vary with the desired molecular weight of the SBR being synthesized. Higher molecular weights are achieved by utilizing smaller quantities of the initiator and lower molecular weights are attained by employing larger quantities of the initiator. However, as a general rule, from 0.005 to 1 phm (parts by weight per 100 parts by weight of monomer) of the initiator will be included in the reaction mixture. In the case of metal persulfate initiators, typically from 0.1 phm to 0.5 phm of the initiator will be employed in the polymerization medium. The molecular weight of the SBR produced is, of course, also dependent upon the amount of chain transfer agent, such as t-dodecyl mercaptan, present during the polymerization. For instance, low molecular weight SBR can be synthesized by simply increasing the level of chain transfer agent. As a specific example, in the synthesis of high molecular weight SBR, the amount of t-dodecyl mercaptan used can be within the range of about 0.125 phm to about 0.150 phm. Low molecular weight SBR can be produced by simply increasing the level of t-dodecyl mercaptan present during the polymerization. For instance, the presence of 0.38 phm to 0.40 phm of t-dodecyl mercaptan will typically result in the synthesis of a low molecular weight SBR.

Unless indicated otherwise, molecular weights are determined by gel permeation chromatography (GPC). A traditional GPC system is used with both light scattering (Wyatt Technologies Inc., model Mini DAWN) and differential refractive index for detection. Samples are filtered through a 1.0 micron pore size syringe filter. In some cases, number average molecular weights are determined by thermal field flow fractionation. Number average molecular weight that is determined by thermal field flow fractionation is sometimes abbreviated as $M_{n3F}$. In determining $M_{n3F}$, a thermal field flow fractionation system that consists of an FFFractionation, LLC (Salt Lake City, Utah) model T-100 Polymer Fractionator with a model T-005 channel spacer, a Hewlett Packard (Palo Alto, Calif.) model 1047A refractive index detector and a Wyatt Technologies Corporation (Santa Barbara, Calif.) model DAWN DSP laser photometer detector is used. In the test procedure, degassed tetrahydrofuran is used as the carrier solvent which is pumped through the system at a flow rate of 0.6 mL/minute. The cold wall temperature in the thermal field flow fractionation is controlled by an FTS Systems model RC150 recirculating chiller.

Polymer fractionation is accomplished using a Power Programmed Method in FFFractionation, LLC in software program TEMP. The program conditions are as follows: Initial Delta T is 60° C., equilibration time is 0.5 minutes, t1 is 5.0 minutes, ta is −6.0, hold time is 30 minutes and final Delta T is 0° C. The temperature set point for the cold wall chiller is 25° C. However, at the initial delta T of 60° C., the cold wall temperature is typically around 40° C. Polymer samples are dissolved in a solvent and then injected unfiltered into the thermal field flow fractionation system. The sample mass injected is typically about 0.12 mg.

The raw data is collected and processed in Wyatt Technologies Corporation in software program ASTRA. The data collection period is 25 minutes. Baselines for the peaks are typically set from 1.5 minutes to 25 minutes for the light scattering detectors and from 1.5 minutes to 20 minutes for the refractive index detector. For the data processing, the DAWN light scattering detectors used include 5 through 16 (representing angles from 39° to 139° in THF). The angular dependence of the light scattering is fit using a first order equation in the Zimm formalism. A refractive index increment (dn/dc) of 0.154 is used for all emulsion polymer samples and 0.140 is used for solution polymer samples. The sensitivity of the refractive index detector (Aux 1 Constant) is determined according to Wyatt Technologies procedures using a monodisperse 30,000 molecular weight polystyrene standard.

Average molecular weights for the samples are calculated using slice data fit to a first order polynomial. The light scattering to refractive index ratio (LS/RI) is calculated using the baseline corrected, normalized voltages from the DAWN 90° detector (d11) and the Hewlett Packard model 1047A refractive index detector. The area under each peak was estimated as the sum of the voltages within the defined integration limits of 2.5 minutes to 21 minutes.

The high molecular weight SBR will typically have a number average molecular weight (by GPC) which is within the range of about 200,000 to about 1,000,000, a weight average molecular weight (by GPC) which is within the range of about 300,000 to about 2,000,000 and a Mooney ML 1+4 viscosity at 100° C. which is within the range of about 80 to about 160. The high molecular weight SBR will preferably have a number average molecular weight which is within the range of about 300,000 to about 970,000, a weight average molecular weight which is within the range of about 400,000 to about 1,750,000 and a Mooney ML 1+4 at 100° C. viscosity which is within the range of about 90 to about 150. The high molecular weight SBR will more preferably have a number average molecular weight which is within the range of about 650,000 to about 930,000, a weight average molecular weight which is within the range of about 1,000,000 to about 1,500,000 and a Mooney ML 1+4 at 100° C. viscosity which is within the range of about 95 to about 130.

The low molecular weight SBR will typically have a number average molecular weight (by GPC) which is within the range of about 20,000 to about 150,000, a weight average molecular weight (by GPC) which is within the range of about 40,000 to about 280,000 and a Mooney ML 1+4 100° C. viscosity which is within the range of about 2 to about 40 at 100° C. The low molecular weight SBR will preferably have a number average molecular weight which is within the range of about 50,000 to about 120,000, a weight average molecular weight which is within the range of about 70,000 to about 270,000 and a Mooney ML 1+4 at 100° C. viscosity which is within the range of about 3 to about 30. The low molecular weight SBR will more preferably have a number average molecular weight which is within the range of about 55,000 to about 110,000, a weight average molecular weight which is within the range of about 120,000 to about 260,000 and a Mooney ML 1+4 at 100° C. viscosity which is within the range of about 5 to about 20. The low molecular weight SBR will usually have a Mooney ML 1+4 at 100° C. viscosity which is within the range of 10 through 18.

The low molecular weight SBR will have a Mooney ML 1+4 at 100° C. viscosity that differs from the Mooney ML 1+4 at 100° C. viscosity of the high molecular weight SBR by at least 50 Mooney points. The high molecular weight SBR will normally have a Mooney ML 1+4 at 100° C. viscosity that is at least 70 Mooney points higher than the Mooney ML 1+4 at 100° C. viscosity of the low molecular weight SBR. The high molecular weight SBR will preferably have a Mooney ML 1+4 at 100° C. viscosity that is at least 80 Mooney points higher than the Mooney ML 1+4 at 100° C. viscosity of the low molecular weight SBR.

The soap systems used in the emulsion polymerization process contain a combination of rosin acid and fatty acid emulsifiers. The weight ratio of fatty acid soaps to rosin acid soaps will be within the range of about 50:50 to 90:10. It is normally preferred for the weight ratio of fatty acid soaps to rosin acid soaps to be within the range of 60:40 to 85:15. It is normally more preferred for the weight ratio of fatty acid soaps to rosin acid soaps to be within the range of 75:25 to 82:18. All of the soap is charged into the first polymerization zone. The total amount of soap employed will be less than 3.5 phm. The quantity of soap employed will normally be within the range of about 2.5 phm to 3.2 phm. It is typically preferred to utilize a level of soap which is within the range of about 2.6 phm to about 3.0 phm. In most cases, it will be most preferred to use an amount of the soap system which is within the range of about 2.7 phm to 2.9 phm. The precise amount of the soap system required in order to attain optimal results will, of course, vary with the specific soap system being used. However, persons skilled in the art will be able to easily ascertain the specific amount of soap required in order to attain optimal results.

The free radical emulsion polymerization will typically be conducted at a temperature which is within the range of about 35° F. (2° C.) to about 65° F. (18° C.). It is generally preferred for the polymerization to be carried out at a temperature which is within the range of 40° F. (4° C.) to about 60° F. (16° C.). It is typically more preferred to utilize a polymerization temperature which is within the range of about 45° F. (7° C.) to about 55° F. (13° C.). To increase conversion levels, it can be advantageous to increase the temperature as the polymerization proceeds.

After the desired monomer conversion is reached, shortstop is added to terminate the copolymerization. This is a convenient point to blend the emulsion of the high molecular weight SBR with the emulsion of the low molecular weight SBR. The weight ratio of the high molecular weight SBR to the low molecular weight SBR in the blend will typically be within the range of about 80:20 to about 25:75. In most cases, the weight ratio of the high molecular weight SBR to the low molecular weight SBR in the blend will be within the range of about 70:30 to about 30:70. It is typically preferred for the weight ratio of the high molecular weight SBR to the low molecular weight SBR in the blend to be within the range of about 60:40 to about 40:60. The emulsion SBR blend of this invention can then be recovered from the latex by using standard coagulation and drying techniques.

The MVR rubber composition used in this invention and made by blending the two latices will have an $M_{n3F}$ which is within the range of 50,000 to 150,000. The styrene-butadiene rubber composition will typically have an $M_{n3F}$ which is within the range of 60,000 to 145,000 and will more typically have an $M_{n3F}$ which is within the range of 75,000 to 140,000. The styrene-butadiene rubber composition will preferably have an $M_{n3F}$ which is within the range of 90,000 to 135,000. The styrene-butadiene rubber composition will also have a light scattering to refractive index ratio (LS/RI) which is within the range of 1.8 to 3.9. The styrene-butadiene rubber composition will typically have a light scattering to refractive index ratio which is within the range of 2.0 to 3.8 and will more typically have a light scattering to refractive index ratio of 2.1 to 3.7. It is preferred for the styrene-butadiene rubber composition to have a light scattering to refractive index ratio which is within the range of 2.2 to 3.0.

In the MVR rubber, if the dynamic oscillation frequency sweep of frequency versus storage modulus (G') and frequency versus loss modulus (G") are plotted, there is a crossover at a frequency within the range of 0.001 radians per second to 100 radians per second when conducted at 90° C. to 120° C. using a parallel plate geometry. In other words, at low frequencies at 120° C., such as 0.1 radians per second, G' is lower than G". However, G' increases with increasing frequency until it equals G" and is ultimately greater than G" at a high frequency, such as 10 radians per second. The crossover point will typically be within the frequency range of 0.001 radians per second to 10 radians per second and will more typically be within the frequency range of 0.01 radians per second to 5 radians per second. In most cases, the crossover point will be within the frequency range of 0.05 radians per second to 1 radian per second at 120°. In the test procedure used, the rubber sample is preformed into a sample 20 mm in diameter having a thickness of 2 mm. The sample is then placed in a control stress rheometer between parallel plates at a given gap distance. The sample is then run through a frequency sweep (such as 0.01 Hz to 100 Hz) at some applied stress amplitude (such as 10,000 Pa to 20,000 Pa). This procedure is conducted at a temperature of 120° C. G' is the storage modulus and represents the elastic portion of the polymer and is very sensitive to changes in gel and molecular weight. G" is the loss modulus and is representative of the viscous portion of the sample.

As indicated above, from 40 to 100 parts of the total parts of sulfur vulcanizable elastomer is the MVR rubber. The remaining balance (if any) of the rubber is an elastomer containing olefinic unsaturation other than the MVR rubber. Preferably, the MVR rubber is from 60 to 90 parts by weight of the total parts of sulfur vulcanizable elastomer used.

Representative examples of "rubber or elastomer containing olefinic unsaturation other than MVR rubber" is intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinyl-ethyl ether. Specific examples of synthetic rubbers include polybutadiene, styrene/isoprene/butadiene rubber, copolymers of 1,3-butadiene or isoprene with monomers such as styrene, acrylonitrile and methyl methacrylate. Additional examples of rubbers which may be used include silicon-coupled and tin-coupled star-branched polymers. The preferred rubber or elastomers are polybutadiene and SBR.

In yet another aspect of the invention, the elastomer other than MVR rubber may be a siloxy-terminated elastomer such as a siloxy-terminated styrene-butadiene copolymer, siloxy-terminated isoprene-butadiene copolymer and siloxy-terminated styrene-isoprene-butadiene terpolymer.

In one aspect the rubber other than MVR rubber is preferably a blend of at least two of diene based rubbers. For example, a combination of two or more rubbers is preferred such as is cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

The relatively high styrene content of about 30 to about 45 for the E-SBR can be considered beneficial for a purpose of enhancing traction, or skid resistance, of the tire tread. The presence of the E-SBR itself is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 10 to about 40, percent. The S-SBR can be conveniently prepared, for example, by organo lithium catalyzation in the presence of an organic hydrocarbon solvent.

A purpose of using S-SBR is for improved tire rolling resistance as a result of lower hysteresis when it is used in a tire tread composition.

The 3,4-polyisoprene rubber (3,4-PI) is considered beneficial for a purpose of enhancing the tire's traction when it is used in a tire tread composition. The 3,4-PI and use thereof is more fully described in U.S. Pat. No. 5,087,668 which is incorporated herein by reference. The Tg refers to the glass transition temperature which can conveniently be determined by a differential scanning calorimeter at a heating rate of 10° C. per minute.

The cis 1,4-polybutadiene rubber (BR) is considered to be beneficial for a purpose of enhancing the tire tread's wear, or treadwear. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The rubber composition should contain a sufficient amount of silica filler to contribute a reasonably high modulus and high resistance to tear. The silica filler may be added in amounts ranging from 10 to 250 phr. Preferably, the silica filler is present in an amount ranging from 30 to 120 phr. If carbon black is present, the amount of carbon black may vary. Generally speaking, the amount of carbon black will vary from 0 to 80 phr. If used, the amount of carbon black will preferably range from 5 to 40 phr. It is to be appreciated that the silica coupler may be used in conjunction with a carbon black, namely pre-mixed with a carbon black prior to addition to the rubber composition, and such carbon black is to be included in the aforesaid amount of carbon black for the rubber composition formulation.

Where the rubber composition contains both silica and carbon black, the weight ratio of silica to carbon black may vary. For example, the weight ratio may be as low as 1:5 to a silica to carbon black weight ratio of 30:1. Preferably, the weight ratio of silica to carbon black ranges from 1:3 to 20:1.

The commonly employed siliceous pigments used in rubber compounding applications can be used as the silica in this invention, including pyrogenic and precipitated siliceous pigments (silica) and aluminosilicates, although precipitate silicas are preferred. The siliceous pigments preferably employed in this invention are precipitated silicas such as, for example, those obtained by the acidification of a soluble silicate, e.g., sodium silicate.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The silica may also be typically characterized by having a dibutylphthalate (DBP) absorption value in a range of about 100 to about 400, and more usually about 150 to about 300.

Further, the silica, as well as the aforesaid alumina and aluminosilicate may be expected to have a CTAB surface area in a range of about 100 to about 220. The CTAB surface area is the external surface area as evaluated by cetyl trimethylammonium bromide with a pH of 9. The method is described in ASTM D 3849 for set up and evaluation. The CTAB surface area is a well known means for characterization of silica.

Mercury surface area/porosity is the specific surface area determined by Mercury porosimetry. For such technique, mercury is penetrated into the pores of the sample after a thermal treatment to remove volatiles. Set-up conditions may be suitably described as using a 100 mg sample; removing volatiles during 2 hours at 105° C. and ambient atmospheric pressure; ambient to 2000 bars pressure measuring range. Such evaluation may be performed according to the method described in Winslow, Shapiro in ASTM Bulletin, Page 39 (1959) or according to DIN 66133. For such an evaluation, a CARLO-ERBA Porosimeter 2000 might be used.

The average mercury porosity specific surface area for the silica should be in a range of about 100 to 300 m²/g.

A suitable pore-size distribution for the silica, alumina and aluminosilicate according to such mercury porosity evaluation is considered herein to be five percent or less of its pores have a diameter of less than about 10 nm; 60 to 90 percent of its pores have a diameter of about 10 to about 100 nm; 10 to 30 percent of its pores have a diameter of about 100 to about 1000 nm; and 5 to 20 percent of its pores have a diameter of greater than about 1000 nm.

The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Z1165 MP and Z165GR and silicas available from Degussa AG with, for example, designations VN2, VN3, BV3380GR, etc, and silicas available from Huber, for example Huber Sil 8745.

The silica fillers are used with sulfur containing organosilicon compounds. Examples of suitable sulfur containing organosilicon compounds are of the formula:

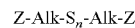

in which Z is selected from the group consisting of

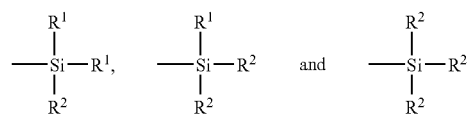

where $R^1$ is an alkyl group of 1 to 4 carbon atoms, cyclohexyl of phenyl; $R^2$ is alkoxy of 1 to 8 carbon atoms, or cycloalkoxy of 5 to 8 carbon atoms; Alk is a divalent hydrocarbon of 1 to 18 carbon atoms and n is from 2 to 8.

Specific examples of sulfur containing organosilicon compounds which may be used in accordance with the present invention include: 3,3"-bis(triethoxysilylpropl)disulfide, 3,3'-bis(triethoxysilylpropyl)tetrasulfide, 3,3'-bis(triethoxysilylpropyl)octasulfide, 3,3'-bis(trimethoxysilylpropyl)tetrasulfide, 2,2'-bis(triethoxysilylethyl)tetrasulfide, 3,3'-bis(trimethoxysilylpropyl)trisulfide, 3,3'-bis(triethoxysilylpropyl)trisulfide, 3,3'-bis(trimethoxysilylpropyl)hexasulfide, 3,3'-bis(trimethoxysilylpropyl)octasulfide, 3,3'-bis (trioctoxysilylpropyl)tetrasulfide, 3,3'-bis(tri-2"-ethylhexoxysilylpropyl)trisulfide, 3,3'-bis (triisooctoxysilylpropyl)tetrasulfide, 2,2'-bis(methoxy diethoxy silyl ethyl)tetrasulfide, 2,2'-bis(tripropoxysilylethyl)pentasulfide, 3,3'-bis(tricyclonexoxysilylpropyl)tetrasulfide, 3,3'-bis(tricyclopentoxysilylpropyl)trisulfide, 2,2'-bis(tri-2"-methylcyclohexoxysilylethyl)tetrasulfide, bis (trimethoxysilylmethyl)tetrasulfide, 3-methoxy ethoxy propoxysilyl 3'-diethoxybutoxy-silylpropyltetrasulfide, 2,2'-bis(dimethyl sec.butoxysilylethyl)trisulfide, 3,3'-bis(methyl butylethoxysilylpropyl)tetrasulfide, 3,3'-bis(di t-butylmethoxysilylpropyl)tetrasulfide, 2,2'-bis(phenyl methyl methoxysilylethyl)trisulfide, 3,3'-bis(diphenyl isopropoxysilylpropyl)tetrasulfide, 3,3'-bis(dimethyl ethylmercaptosilylpropyl)tetrasulfide, 2,2'-bis(methyl dimethoxysilylethyl)trisulfide, 2,2'-bis(methyl ethoxypropoxysilylethyl) tetrasulfide, 3,3'-bis(diethyl methoxysilylpropyl)tetrasulfide, 3,3'-bis(butyl dimethoxysilylpropyl)trisulfide, 3,3'-bis(phenyl dimethoxysilylpropyl)tetrasulfide, 3-phenyl ethoxybutoxysilyl 3'-trimethoxysilylpropyl tetrasulfide, 4,4'-bis(trimethoxysilylbutyl)tetrasulfide, 6,6'-bis(triethoxysilylhexyl) tetrasulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl)tetrasulfide, 4,4'-bis(trimethoxysilylcyclohexylene)tetrasulfide, 5,5'-bis (dimethoxymethylsilylpentyl)trisulfide, and 3,3'-bis(trimethoxysilyl-2-methylpropyl)tetrasulfide.

The preferred sulfur containing organosilicon compounds are the 3,3'-bis(trimethoxy or triethoxy silylpropyl) sulfides. The most preferred compound is 3,3'-bis(triethoxysilylpropyl)tetrasulfide. Preferably Z is

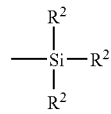

where $R^2$ is an alkoxy of 2 to 4 carbon atoms, with 2 carbon atoms being particularly preferred; Alk is a divalent hydrocarbon of 2 to 4 carbon atoms with 3 carbon atoms being particularly preferred; and n is an integer of from 2 to 5.

The amount of the above sulfur containing organosilicon compound in a rubber composition will vary depending on the level of silica that is used. Generally speaking, the amount of the compound will range from 0.01 to 0.1 parts by weight per part by weight of the silica. Preferably, the amount will range from 0.04 to 0.08 parts by weight per part by weight of the silica.

In terms of the rubber compound, the amount of organosilicon compound will range from 0.1 to 25 phr. Preferably, the range will be 1 to 10 phr.

A critical aspect of the present invention is the addition of zinc oxide to the productive mix stage. There should be no zinc oxide that is added or present during the non-productive stage of mixing. Generally speaking, from 1 to 8 phr of zinc oxide is added or present during the production stage of mixing. Preferably, from 2 to 4 phr of zinc oxide is present.

In addition to the zinc oxide, a sulfur vulcanizing agent is added to the rubber during productive stage mixing. Representative examples of sulfur donors or vulcanizing agents include elemental sulfur (free sulfur), an amine disulfide, polymeric polysulfide and sulfur olefin adducts. Preferably, the sulfur vulcanizing agent is elemental sulfur. The sulfur vulcanizing agent may be used in an amount ranging from 0.5 to 5 phr. Preferably, the amount of vulcanizing agent will range from 1.5 to 2.5 phr.

It is readily understood by those having skill in the art that the rubber composition may contain conventional additives generally known in the rubber compounding art, such as, for example, curing aids, such as activators and retarders and processing additives, such as oils, resins including tackifying resins and plasticizers, fillers, pigments, fatty acid, waxes, antioxidants and antiozonants and peptizing agents. As known to those skilled in the art, depending on the intended use of the sulfur vulcanizable and sulfur vulcanized material (rubbers), the additives mentioned above are selected and commonly used in conventional amounts. Typical amounts of reinforcing type carbon blacks(s), for this invention, if used, range from 20 to 150 phr. Representative examples of such carbon blacks include N 110, N 115, N121, N134, N220, N231, N234, N242, N293, N299, N330, N339, N343, N347, N351, N358, N375, N660, N683, N754, N762, N765, N774, N907, N908, N990 and N991. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, preferably about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber composition is accomplished by at least one non-productive stage and a productive stage. For example the ingredients may be mixed in three stages, namely two non-productive stages followed by a productive mix stage. The zinc oxide and final curatives including sulfur vulcanizing agents are mixed in the final stage which is conventionally called the "productive" mix stage in which the mixing typically occurs at a temperature, or ultimate temperature, lower than the mix temperature(s) than the preceding non-productive mix stage(s). The MVR rubber, as well as any other additional rubber, silica and silane of Formula I are mixed in one or more non-productive mix stages. The terms "non-productive" and "productive" mix stages are well known to those having skill in the rubber mixing art. The sulfur vulcanizable rubber composition containing the vulcanizable rubber, silica as well as the sulfur-containing organosilicon compound, is subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be from 1 to 20 minutes. Preferably, the duration of the thermomechanical mixing ranges from 3 to 10 minutes. The productive stage is characterized by mixing conditions so the rubber temperature does not exceed 120° C. for concern in initiating cure of the rubber. Generally speaking, the rubber temperature during the productive stage ranges from 100° C. to 120° C.

In additional accordance with the invention, the process comprises the additional steps of preparing an assembly of a tire or sulfur-vulcanizable rubber with a tread comprised of the said rubber composition prepared according to the process of this invention and vulcanizing the assembly at a temperature in a range of about 140° C. to about 190° C. Accordingly, the invention also thereby contemplates a vulcanized tire prepared by such process.

In further accordance with the invention, the method of the present invention comprises the additional step of vulcanizing the prepared rubber composition at a temperature in a range of about 140° C. to about 190° C. in the presence of a sulfur vulcanizing agent. Accordingly, the invention also thereby contemplates a vulcanized rubber composition prepared by such process. Preferably, the vulcanization is conducted at temperatures ranging from about 110° C. to 180° C. Any of the usual vulcanization processes may be used such as heating in a press or mold, heating with superheated steam or hot air or in a salt bath.

Upon vulcanization of the sulfur vulcanized composition, the rubber composition of this invention can be used for various purposes. For example, the sulfur vulcanized rubber composition may be in the form of a tire, belt or hose. In case of a tire, it can be used for various tire components. Such tires can be built, shaped, molded and cured by various methods which are known and will be readily apparent to those having skill in such art. Preferably, the rubber composition is used in the tread of a tire. As can be appreciated, the tire may be a passenger tire, aircraft tire, truck tire and the like. Preferably, the tire is a passenger tire. The tire may also be a radial or bias, with a radial tire being preferred.

EXAMPLE I

In this example, two multiviscoelastic response rubbers were evaluated in a silica filled rubber composition where the variable was the mixing stage when the zinc oxide was added.

Rubber compositions containing the materials set out in Tables 1 and 2 were prepared in a BR Banbury™ mixer using three separate stages of addition (mixing); namely, two non-productive mix stages and one productive mix stage. The first non-productive stage was mixed for two minutes at a rubber temperature of 160° C. The second non-productive stage was mixed for two minutes at 160° C. The drop temperature for the productive mix stage was 115° C.

The rubber compositions are identified herein as Examples A through F. Examples B, D, E and F are considered as controls due to the absence of zinc oxide being added in the productive stage or the absence of an MVR rubber being used.

The examples were cured at about 160° C. for about 14 minutes.

Table 2 illustrates the behavior and physical properties of the cured Examples 1 through 6.

TABLE 1

| Example | No. A | Control No. B | No. C | Control No. D | Control No. E | Control No. F |
|---|---|---|---|---|---|---|
| Rubber type | MVR 40/40 | MVR 40/40 | MVR 23/50 | MVR 23/50 | ESBR | ESBR |
| Zinc oxide addition | PR | NP1 | PR | NP1 | PR | NP1 |
| First Non-productive Mixing | | | | | | |
| Cis 1,4-polybutadiene rubber[1] | 25 | 25 | 25 | 25 | 25 | 25 |
| SBR[2] | 75 | 75 | 75 | 75 | 75 | 75 |
| Precipitated silica[3] | 75 | 75 | 75 | 75 | 75 | 75 |
| Coupling agent[4] | 12 | 12 | 12 | 12 | 12 | 12 |
| Processing oil[5] | 20 | 20 | 20 | 20 | 28 | 28 |
| Waxes[6] | 1.5 | 1.5 | 1.5 | 1.5 | 1.5 | 1.5 |
| Stearic acid | 3 | 3 | 3 | 3 | 3 | 3 |
| Zinc oxide | 0 | 2.5 | 0 | 2.5 | 0 | 2.5 |
| Second Non-productive Mixing | | | | | | |
| Antidegradant[7] | 2.25 | 2.25 | 2.25 | 2.25 | 2.25 | 2.25 |
| Productive Mixing | | | | | | |
| Zinc oxide | 2.5 | 0 | 2.5 | 0 | 2.5 | 0 |
| Sulfur | 2 | 2 | 2 | 2 | 2 | 2 |
| Accelerator, sulfenamide and guanidine types | 3.15 | 3.15 | 3.15 | 3.15 | 3.15 | 3.15 |
| Antidegradant[8] | 1 | 1 | 1 | 1 | 1 | 1 |

[1]Cis-1,4-polybutadiene rubber obtained as Budene ® 1207 from The Goodyear Tire & Rubber Company
[2]MVR 40/40: Latex blended E-SBR composed by 50 weight percent of an Emulsion SBR with Mooney ML/4 viscosity at 100° C. of about 120 and a styrene content of about 40 weight percent and a glass transition temperature of about −30° C.; and 50 weight percent of an Emulsion SBR with Mooney ML/4 viscosity at 100° C. of about 15 and a styrene content of about 40 weight percent and a glass transition temperature of about −30° C.
[2]MVR 23/50: Latex blended E-SBR composed by 50 weight percent of an Emulsion SBR with Mooney ML/4 viscosity at 100° C. of about 120 and a styrene content of about 23 weight percent and a glass transition temperature of about −55° C.; and 50 weight percent of an Emulsion SBR with Mooney ML/4 viscosity at 100° C. of about 15 and a styrene content of about 50 weight percent and a glass transition temperature of about −17° C.

TABLE 1-continued

| Example | Control No. A | Control No. B | Control No. C | Control No. D | Control No. E | Control No. F |
|---|---|---|---|---|---|---|

[2]ESBR: ESBR 1721 with 37.5 phr aromatic oil; 28 phr processing oil in Examples E to F are introduced with E-SBR 1721 glass transition temperature (Tg) of about −32.5° C. Tgs have been measured in each case as DSC (scanning calorimeter) mid point at a heating rate of 10° C. per minute.
[3]Zeosil 1165MP from Rhodia S.A.
[4]Composit of bis-(3-triethoxysilylpropyl) tetrasulfide (TESPT obtained as X50S from Degussa S.A.) and carbon black in 50/50 weight ratio
[5]Aromatic rubber processing oil
[6]Microcrystalline and paraffinic waxes
[7 and 8]Phenylene diamine types

TABLE 2

| Example | No. A | No. B | No. C | No. D | No. E | No. F |
|---|---|---|---|---|---|---|
| Rubber type | MVR 40/40 | MVR 40/40 | MVR 23/50 | MVR 23/50 | ESBR | ESBR |
| Zinc oxide addition | PR | NP1 | PR | NP1 | PR | NP1 |
| Compound viscosity | | | | | | |
| MS/1.5 100° C. | 45.5 | 34.7 | 45 | 34.2 | 53 | 37 |
| Shore A 23° C. | 67.5 | 69.9 | 65.9 | 68.1 | 64.3 | 67.8 |
| RPA G' 100° C. (MPa) (1% strain) | 2.13 | 2.842 | 2.146 | 2.635 | 2.077 | 2.714 |
| Zwick Rebound | | | | | | |
| 0° C. (%) | 9.1 | 9.1 | 12 | 12 | 11.3 | 10.7 |
| Viscoelastic properties at −10° C. (Metravib Equipment, 7.8 Hz, 1.5% strain) | | | | | | |
| G' (Pascal) | 1.03 E+07 | 1.56 E+07 | 1.61 E+07 | 2.24 E+07 | 1.02 E+07 | 1.05 E+07 |
| G" (Pascal) | 7.8 E+06 | 1.12 E+07 | 1.05 E+07 | 1.38 E+07 | 6.55 E+06 | 6.56 E+06 |
| Tan delta | 0.755 | 0.718 | 0.649 | 0.612 | 0.643 | 0.623 |
| Zwick Rebound | | | | | | |
| 23° C. (%) | 36.3 | 30.8 | 36.3 | 32.1 | 34.6 | 32.8 |
| 100° C. (%) | 69.1 | 64 | 66.8 | 63 | 64.3 | 62.6 |
| RPA tan delta 100° C. (10% strain) | 0.092 | 0.115 | 0.102 | 0.107 | 0.103 | 0.115 |
| DIN abrasion volume loss mm³ | 95 | 116 | 100 | 110 | 103 | 124 |
| ASTM D412 Tensile Properties | | | | | | |
| Elongation (%) | 427 | 477 | 443 | 494 | 549 | 532 |
| Tensile strength (MPa) | 24.3 | 21.9 | 24.1 | 21.8 | 25.5 | 22.7 |
| Modulus 100% (MPa) | 2.7 | 2.6 | 2.4 | 2.2 | 1.8 | 2.2 |
| Modulus 300% (MPa) | 15.9 | 12.7 | 14.5 | 11.3 | 10.4 | 10.9 |
| Modulus ratio (300/100) | 5.8 | 4.8 | 6 | 5 | 5.7 | 4.8 |

(RPA, = Monsanto Rubber Process Analyzer)

The compound properties of E-SBR containing compounds can be highly improved through avoiding the addition of zinc oxide into the first non-productive stage, together with the silane coupling agent. By comparing Example A versus Example B, Example C versus Example D and Example E versus Example F, one can see that compounds with zinc oxide in the productive stage show an improved silica/polymer interaction, resulting in (A) increased Zwick rebound 100 and respective reduced tan delta at 100° C., both being indicative of a reduced tire rolling resistance;
(B) reduced DIN abrasion and increased modulus ratio (300/100), both being indicative of increased tire mileage;
(C) increased tan delta and G" at −10° C., 7.8 Hz, indicative of improved tire wet braking; and
(D) increased tensile strength, being indicative of improved tire durability.

Further, the increased silica/polymer interaction is confirmed through an increased high strain reinforcement at 300 percent combined with a reduced shear modulus G' measured by RPA at one percent.

These improvements in physical compound properties are, however, accompanied by an increase in compound plasticity. With regular E-SBR, one can see that a critical compound plasticity increase results (Example E versus Example F), with Compound E (zinc oxide in the productive stage) being above the critical plasticity limit of a compound, despite the usage of 8 phr more processing oil than in Examples A, B, C and D. It can be readily seen that the addition of zinc oxide in the productive stage in compounds with MVR rubbers (Example A versus Example B and Example C versus Example D), leads to a less pronounced compound plasticity increase, with Compounds A and C staying below a critical compound plasticity limit. In addition, the fact of adding zinc oxide in the productive stage in the presence of MVR rubbers leads to much more significant improvements in physical properties, compared to the effect with regular E-SBR. The addition of zinc oxide in the productive stage leads with MVR compared versus E-SBR to (A) a more highly increased Zwick rebound 100° C. and further reduced tan delta 100° C., both being indicative of a further reduced rolling resistance; and
(B) a more highly increased high strain Modulus at 300 percent.

Improved compound properties, indicative of improved tire rolling resistance, wet braking, wear and durability can thus be obtained with MVR rubbers without exceeding a critical compound processability limit.

While certain representative embodiments and details have been shown for the purpose of illustrating the invention, it will be apparent to those skilled in this art that various changes and modifications may be made therein without departing from the spirit or scope of the invention.

What is claimed is:

1. A method for processing a rubber composition by a multi-stage mixing procedure, the method comprising:
    (A) mixing a rubber composition at a rubber temperature in a range of from 140° C. to 190° C. for a mixing time of from 1 to 20 minutes, said rubber composition comprising
        (1) 100 parts by weight of at least one sulfur vulcanizable elastomer wherein
            (a) from 40 to 100 parts by weight of said vulcanizable elastomer is a multi-viscoelastic response rubber wherein said multi-viscoelectric response rubber is an emulsion styrene-butadiene rubber composition comprised of
                (A) a high molecular weight styrene-butadiene rubber having a weight average molecular weight of at least about 300,000; and
                (B) a low molecular weight styrene-butadiene rubber having a weight average molecular weight which is less than about 280,000;

wherein the ratio of the high molecular weight styrene-butadiene rubber to the low molecular weight styrene-butadiene rubber is within the range of about 80:20 to about 25:75; wherein the styrene-butadiene rubber composition is made by coagulating a blend of a latex of the high molecular weight styrene-butadiene rubber and a latex of the low molecular weight styrene-butadiene rubber; and (b) from zero to 60 parts by weight of said vulcanizable elastomer is a rubber containing olefinic unsaturation other than said multi-viscoelastic rubber;

(2) from 0.1 to 25 phr of an organosilicon compound of the formula:

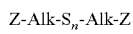

in which Z is selected from the group consisting of

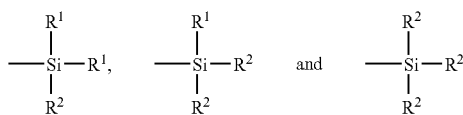

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent hydrocarbon of 1 to 18 carbon atoms and n is from 2 to 8;

(3) from 10 to 250 phr of a silica filler; and (4) the absence of zinc oxide to form a non-productive compound; and (B) mixing a productive compound at a rubber temperature not to exceed 120° C., the productive compound comprising (1) said non-productive compound;

(2) from 0.5 to 5 phr of a sulfur vulcanizing agent; and (3) from 1 to 8 phr of zinc oxide.

2. The method of claim 1 wherein said multi-viscoelastic response rubber is a styrene-butadiene rubber composition which is comprised of repeat units which are derived from styrene and 1,3-butadiene, wherein the styrene-butadiene rubber composition has a number average molecular weight as determined by thermal field flow fractionation which is within the range of about 50,000 to 150,000 and wherein the styrene-butadiene rubber has a light scattering to refractive index ratio which is within the range of 1.8 to 3.9.

3. The method of claim 1 wherein said multi-viscoelastic response rubber is a styrene-butadiene rubber composition which is comprised of repeat units which are derived from styrene and 1,3-butadiene, wherein a plot of log frequency versus storage modulus of the styrene-butadiene rubber composition crosses over a plot of log frequency versus loss modulus of the styrene-butadiene rubber composition at a frequency within the range of 0.001 radians per second to 100 radians per second when conducted at 90° C. to 120° C. using parallel plate geometry in the dynamic oscillation frequency sweep of the styrene-butadiene rubber.

4. The method of claim 1 wherein the Mooney ML 1+4 viscosity at 100° C. of the high molecular weight styrene-butadiene rubber ranges from 80 to 160 and the Mooney ML 1+4 viscosity at 100° C. for the low molecular weight styrene-butadiene rubber ranges from 2 to 40.

5. The method of claim 1 wherein said sulfur vulcanizable elastomer containing olefinic unsaturation other than multi-viscoelastic rubber is selected from the group consisting of natural rubber, polyisoprene, butyl rubber, halobutyl rubber, polybutadiene, styrene-butadiene copolymer, styrene/isoprene/butadiene rubber, methyl methacrylate-butadiene copolymer, isoprene-styrene copolymer, methyl methacrylate-isoprene copolymer, acrylonitrile-isoprene copolymer, acrylonitrile-butadiene copolymer, silicon-coupled star-branched polymers, tin-coupled rubbers, star-branched polymers, siloxy-terminated elastomers and mixtures thereof.

* * * * *